United States Patent [19]

Klausecker et al.

[11] 4,365,286
[45] Dec. 21, 1982

[54] AUDIO-FREQUENCY POWERLINE CARRIER CONTROL SYSTEM WITH A CURRENT SUPERVISORY DEVICE

[75] Inventors: Karl Klausecker, Erlangen; Manfred Müller, Nuremberg, both of Fed. Rep. of Germany

[73] Assignee: Siemens Aktiengesellschaft, Munich, Fed. Rep. of Germany

[21] Appl. No.: 239,976

[22] Filed: Mar. 3, 1981

[30] Foreign Application Priority Data

Mar. 5, 1980 [DE] Fed. Rep. of Germany ....... 3008480

[51] Int. Cl.[3] ............................................. H02H 7/122
[52] U.S. Cl. ........................................ 363/58; 361/93
[58] Field of Search ...................... 363/55, 56, 57, 58; 361/100, 93, 94, 76, 77

[56] References Cited

U.S. PATENT DOCUMENTS 3,898,531 8/1975 Hinman, Jr. ...................... 361/76 X

FOREIGN PATENT DOCUMENTS 2456344 8/1976 Fed. Rep. of Germany ........ 363/58
2750394 5/1979 Fed. Rep. of Germany ........ 363/58

Primary Examiner—Reinhard J. Eisenzopf
Attorney, Agent, or Firm—Kenyon & Kenyon

[57] ABSTRACT

A power line control circuit receives audio-frequency signals from a pulsed inverter that is transformer-coupled to the power line. A filter circuit is connected between the inverter and the coupling transformer primary circuit to transmit the audio signals and prevent power line frequencies from reaching the inverter. A magnitude-measuring circuit determines when output current from the inverter exceeds a certain value and controls an intervening circuit to reverse, briefly, the state of conductivity of the inverter.

8 Claims, 3 Drawing Figures

AUDIO-FREQUENCY POWERLINE CARRIER CONTROL SYSTEM WITH A CURRENT SUPERVISORY DEVICE

BACKGROUND OF THE INVENTION

The invention relates to an audio-frequency powerline carrier control system. Such a powerline carrier control system is known from German Offenlegungsschrift No. 27 50 394.

In powerline carrier control systems, information coded as a train of pulses is sent via a power supply network, which may be three-phase or single-phase, to consumer locations where the signals are decoded and used to control switching operations. For instance, such signals can be used to switch consumer watt-hour meters to different rates or to carry signals to energize warning devices some distance away, such as fire alarms at fire stations. Usually, audio-frequency oscillations in the frequency range between 150 and 500 Hz are used for the duration of predetermined pulse cycles.

For transmission, signals at these frequencies are generated by an inverter and are superimposed on the network frequency by a series-feed circuit. A d-c input voltage impressed on the inverter in part, has a magnitude which is determined by appropriate firing of inverter valves with the audio-frequency transmission signals in the form of voltage blocks of 180° length with alternating sign to the outputs of the inverter. There are two such outputs if the power is transmitted on a single-phase network and three if the network is three-phase. For d-c separation and voltage matching of the phase voltages, it is convenient to connect series inductances and a matching transformer to the outputs. These inductances are made as small as possible, consistent with obtaining good attenuation of the harmonics and not causing excessive voltage drops under load. The series feeding of the transmitted signal is accomplished by current transformers, and if the network is a three-phase one, the primary windings of the transformers are delta-connected and are connected to the phase voltages. The secondary windings of the transformers are connected in series in the respective lines of the supply network. Filter circuits are arranged in parallel with the transformer primaries and are designed as three-phase filters so that they protect the inverter against reactions of the network frequency by presenting a low impedance at the network frequency. On the other hand, they transmit the audio frequency as loss-free as possible to the current transformers by having a high impedance for this audio frequency.

When the transmitter is turned on, i.e., at the start of each transmitting cycle, a considerable switching surge is produced which is not attenuated sufficiently by the small series inductances and which leads to overloading the inverter by large current peaks. It is therefore advantageous, as is proposed in German Auslegeschrift No. 24 56 344, to use an inverter in the form of a pulse inverter in which, by alternately firing the inverter valves, which operate on a respective phase output within each audio-frequency half wave, at a higher frequency, each phase voltage of the inverter output is composed of short voltage blocks of alternating sign. Each phase voltage therefore contains an audio-frequency fundamental and harmonics, and the harmonics are smoothed by the series inductances and possibly also by the matching transformer to that they are fed to the transformer inputs as a nearly sinusoidal voltage, due to resonance processes in the filter circuits. The amplitude of the audio-frequency fundamental can be varied by the duty cycle of the respective inverter valve of a phase output, i.e., by the voltage-time area of the corresponding phase voltage. This makes it possible to increase the pulse inverter to the full output power at the start of each transmitting cycle, by appropriately controlling the duty cycle so that unduly high switching peaks of the current are avoided.

Even so, short peak currents ("overcurrents") can occur at the inverter output due to other disturbances, for instance, load fluctuations, or transients, during which reliable commutation of the inverter is no longer possible. Therefore, the system must be monitored for overcurrent in order to protect the inverter by shutting down the system or by some other intervention into the inverter control. Shutting down should be performed only in extreme emergencies since this can lead only to mutilation of the information and thus to incorrect actions by apparatus or persons receiving that information.

To avoid such an event, the previously mentioned German Offenlegungsschrift No. 27 50 394 includes a monitoring device that determines the phase current between the inverter and the filter circuits and intervenes, if a predetermined current limit is exceeded, into the firing controls of the inverter in such a manner that the amplitude of the audio-frequency phase voltages is reduced by reducing the voltage-time areas to bring the transmitter back to full output power gradually, as in the starting process. It has now been found in some cases that in such a system, in which the firing control of all inverter valves is changed in the direction of reducing the transmitted power if the monitoring system responds, the monitoring system responds in some cases frequently, one time after the other. It is then possible to bring the transmitter to maximum power only very slowly or perhaps not at all. In such a case it it possible that the reduced transmitter power will no longer be sufficient for transmitting the transmitter signals to the receivers.

This can happen, for instance, if the overvoltage peaks are not caused by temporary disturbances, such as would be the case if the filter circuits were short-circuited during the transmitting intervals by corresponding switches opened at the start of a transmitting cycle. Such switches are advantageous to protect the filter circuits during the transmitting breaks.

OBJECTS AND SUMMARY OF THE INVENTION

It is an object of the invention to provide powerline carrier control transmitter which reaction is possible by intervention into the inverter control, not only in response to peak currents, but in such a way that a possible cause for their occurence itself is corrected.

In particular, it is an object of the invention to improve the operation of a powerline carrier control system, the filters of which can be short-circuited by switches during breaks in the transmitting intervals.

It has been found that the transformer of such a power line carrier control system is frequently premagnetized at the start of a transmitting cycle. Such premagnetization occurs particularly when the switches are opened at the start of the transmitting cycle, if these switches are used for the filter circuits. The premagnetization manifests itself by the fact that the approximately sinusoidal wave form of the magnetic flux in the transformers, which is measurable as the time integral of the feeding voltage impressed on the transformer coils, is shifted relative to the center of the hysteresis characteristics of the transformer. As a result, the transformers are always driven into saturation at every second half-wave of the audio-frequency supply voltage, so that the current drain from the inverter is increased. This invention is based on the idea of protecting the inverter by reducing the voltage-time area of the corresponding audio-frequency phase output voltage half-wave (and thereby the instantaneous output current), if such a peak current occurs at the transformer output, as well as combatting the cause, which is the premagnetization of the transformers.

As soon as the current exceeds the predetermined limit at one of the phase output of the inverter, the monitoring device delivers an intervention command associated with this respective inverter output. This command intervenes only into the control of the inverter valves working on this output; the control of the other inverter valves remains untouched. The intervention is accomplished in such a way that the phase voltage present at the corresponding output contains a d-c component which results in a d-c demagnetizing component in the transformer. The polarity of this d-c component is opposed to the peak current, so that the peak current triggering the intervention command is reduced simultaneously.

If such an intervention command occurs when the inverter has already been brought to full output power and the phase output voltages are generated by voltage blocks of half the audio frequency period with alternating sign, and if an intervention command occurs during a positive phase output voltage, the polarity is accordingly reversed briefly by firing the other inverter valve and thereby connecting the corresponding phase output temporarily to a negative voltage. During the next audio-frequency half-wave, when a negative phase output voltage is generated, the intervention is not continued. The positive voltage half-wave is therefore reduced once as compared to undisturbed operation. Similarly, provision may also be made in this manner if the audio-frequency fundamental of the phase voltage is generated by multiple alternating firing of the inverter valve (back-and-forth pulsing of the phase output voltage between two voltage values of opposite sign) within each audio-frequency half-wave. This occurs particularly during the starting-up process, in which the amplitude of the audio-frequency is brought up slowly by appropriate pulse operation. A positive current peak, for instance, coincides during such a start-up prodecure with an operating state of the inverter, in which the inverter output is connected to the positive input voltage by current conduction of the corresponding inverter valves. The intervention command then causes this valve to be blocked, and the inverter output is temporarily connected to the negative voltage terminal by firing the other valve. The voltage-time area of the positive audio-frequency half-wave is thereby reduced relative to the value which is provided for the undisturbed starting process and corresponds approximately to the mean value of the preceding half-wave and the following negative half-wave.

The duration for which the respective other valve must be fired to generate the d-c voltage component must not fall below a certain value, which corresponds to the shortest possible current conduction period of the inverter. A particularly simple control is obtained if the duration of the voltage reversal is kept constant at this minimum current conduction period of the inverter. Upon each intervention command, the voltage-time area is therefore reduced by an amount which is independent of the duration for which the current limit is exceeded.

When an intervention command occurs, an intervention is preferably made only once and the further firing control is left undisturbed. However, if the phase current exceeds the limit again after one intervention, this leads to a new intervention command and, in that case, the correction measure is repeated. This can happen if the premagnetization of the transformer cannot be corrected in one step or if the overcurrents are not due to the premagnetization of the transformers but to other causes. In such cases, the peak currents can occur in all phase outputs and during the positive as well as during the negative audio-frequency half-waves. This leads to intervention commands for all phase outputs and for all polarities, so that, overall, the total amplitude of the audio-frequency oscillation is reduced. Serious disturbances, however, are expected only if the peak currents cannot be reduced sufficiently in spite of these measures. For such a serious disturbance it may be advantageous to shut down the entire system by means of a limit monitor if the phase currents exceed the mentioned limits of the monitoring device considerably.

The invention will now be explained in further detail, making reference to an embodiment example and two figures.

DETAILED DESCRIPTION OF THE INVENTION

Figure 1:
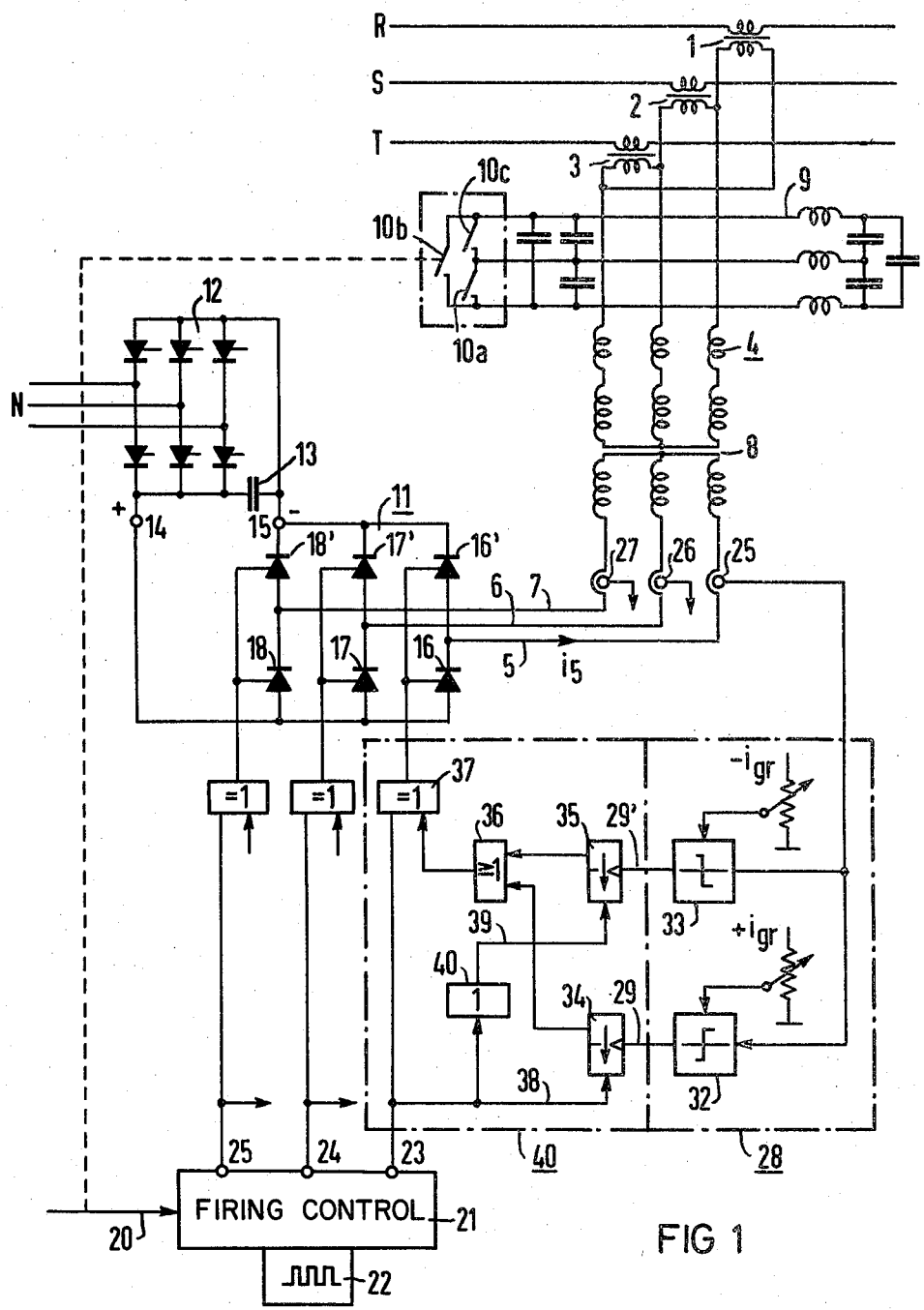
FIG. 1 shows a power line carrier control system according to the invention.

According to FIG. 1, an audio-frequency signal voltage is impressed on the phase lines R, S, T of a three-phase power network. For this purpose, the secondaries of three transformers are connected in series with the power lines and the delta-connected primary coils 1-3 connected via inductances 4 to respective output lines 5, 6, 7 of an inverter. An inverter transformer 8 provides d-c separation and matching of the voltages. Filter circuits of a three-phase filter 9 constructed from capacitors and inductances are connected directly in shunt with the primaries 1-3. A switching arrangement consisting of switches 10a, 10b, 10c is connected to the leads of the coils to permit the coils to be connected to each other so that the filter circuits can be short-circuited.

A self-commutating inverter 11 serves as the transmitter for the audio-frequency voltages in the inverter output lines 5, 6, 7. A predeterminable d-c input voltage is impressed on the d-c side of the inverter 11 from a low-frequency a-c network N via a line-commutated rectifier 12 and a parallel capacitor 13. The inverter 11 is preferably arranged as a bridge circuit operated by pulses, and the outputs of the inverter are either connected to the positive input terminal 14 by triggering the corresponding valves 16-18 of each bridge arm or the negative input terminal 15, if the other valves 16'-18' are made conductive.

The length of the transmitting periods for the audio frequency signal and the intervals therebetween are predetermined via a line 20 of a firing control 21. The latter forms the inverter firing pulses from the pulses of a generator device 22 to the audio frequency or a multiple of the audio frequency. During the intervals between transmissions all inverter firing pulses are suppressed, and during the transmitting periods, corresponding voltage pulses are applied to the firing control lines 23, 24, 25 from which the control units (not shown) of the valves 16, . . . , 18' form the firing pulses for the inverter valves.

Figure 2:
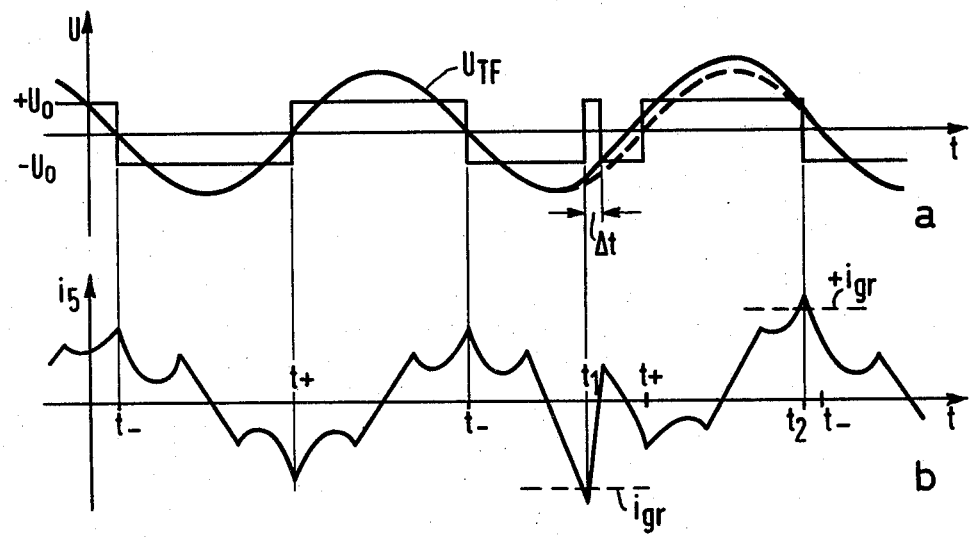
FIG. 2 the waveform of a phase voltage and a phase current in unpulsed operation of the inverter, and FIG. 3 the waveform of the phase voltage in pulsed operation.
Figure 3:
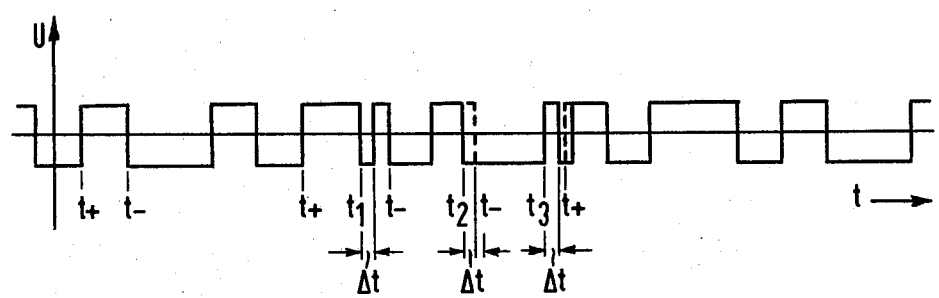

The parts of the system according to FIG. 1 described so far maybe connected as described in German Auslegeschrift No. 24 56 344. In that known system, a voltage which, as the result of binary signals, assumes, alternately, the values $+U_o$ and $-U_o$, is generated by the control device for each bridge branch. At the control line 23, such a binary signal sequence causes the valve 16 always to be conductive then the voltage of the control device has the value $+U_o$. This is the "1" state. The other valve 16' of the same bridge branch becomes conductive when the voltage of the control device has the value $-U_o$. This is the "0" state. The voltage at the inverter output phase 5 follows this waveform. Pulse width modulation can be carried out, in which the fundamental oscillation $U_{TF}$ of the phase voltage and, therefore, also the fundamental of the voltage-time areas correspond to the audio frequency. During starting-up time at the beginning of each transmitting cycle, as shown in FIG. 3, the amplitude of the oscillation $U_{TF}$ is increased by changing the pulse width modulation until, for maximum output power, the phase voltage is composed of voltage blocks 180° wide, as shown in FIG. 2. This known pulse width modulation is also advantageous for the inverter 11.

FiG. 2b shows the waveform of the current $i_5$ in the inverter output line 5. Switching points $t_+$ and $t_-$ are predetermined by the firing control, at which the polarity of the phase voltage is reversed by firing the valve 16 or 16' respectively. It is possible for the current in the line 5 to exceed a predetermined limit at certain times, such as the times $t_1$ and $t_2$. The limit can have either a positive value $+i_{gr}$ or a negative value $-i_{gr}$. The magnitude of the limit is predetermined so that reliable commutation in the inverter is still possible. If this limit is exceeded, intervention into the inverter control is necessary.

The previously-mentioned German Offenlegungsschrift No. 27 50 394 describes determining the currents in the individual inverter outputs, to form therefrom a common value for the total inverter output current, and to intervene into the inverter control if this output current exceeds a predetermined limit. The intervention is made so that the current is limited by lowering the amplitude of each voltage at the phase output lines 5, 6, 7. This invervention is made by changing the pulse width modulation; the waveform of the voltage $U_{TF}$ continues to be symmetrical about zero.

In contrast thereto, the present invention arranges for each individual phase current to be monitored separately in the monitoring device 28 (FIG. 1) to determine when the limit $|i_{gr}|$ is exceeded. The monitoring device thus has three symmetrical branches, each of which is associated with the transformer 25a, 26 or 27, respectively. For the sake of clarity, only one of these branches, the branch 28, is shown in FIG. 1.

If the limit magnitude of the phase current $i_5$ is exceeded, the monitoring device 28 generates at the command lines 29, 29' an intervention command by which the valves 16 and 16' of the bridge branch associated with the phase line 5 are switched relative to their undisturbed operation. It is desirable for the duration of the switching to be chosen independently of the duration for which the current limit is exceeded. This purpose can be served by time delay stages, i.e., the monostable multivibrators 34 and 35, which are adjusted to the shortest possible conduction time of the inverter valves. Customary pulsed inverter controls already contain a circuit for suppressing switching commands which follow each other too closely, so that no further time delay stages are required for executing the intervention command. It is sufficient in this instance to intervene with the intervention command at a suitable point of the inverter firing control and, when the limit is exceeded, to negate there, temporarily, the binary signal sequence from which the firing pulses of the inverter valves are derived. This may be done, for instance, by means of an EXCLUSIVE-OR gate addressed by the intervention commands.

In FIG. 1, a circuit is shown schematically which can be inserted between the firing control output of an existing inverter control and the control equipment for the corresponding valves 16 and 16'. It is desirable for the output signal of the current transformer 25 to be monitored by separate limit indicators 32, 33 to determine when the limit magnitude, either the positive limit $+i_{gr}$ or the negative limit $-i_{gr}$, is exceeded.

As long as the limit indicators 32 and 33 do not indicate that a limit has been exceeded and the following monostable multivibrators 34 and 35 are not triggered, the OR gate 36 following the multivibrators applies a 0 to the corresponding input of an EXCLUSIVE-OR gate 37 in series with the control line 23. The states (0 or 1) coming from the control 21 are therefore fed unchanged to the gates of the valves 16 and 16' via the stage 37. This undisturbed operation is shown in FIG. 2 prior to the time $t_1$, the time at which the response of the limit indicator 32 indicates that the signal has fallen below the negative limit.

The multivibrator 34 can be inhibited by a signal on the line 38 to cause the limit indicator 32 associated with the positive limit to force the multivibrator 34 to generate a 1 only if there is a 1 present on the signal line 23, i.e. if, in undisturbed operation, the phase voltage is positive because the valve 16 is conductive. The output of the multivibrator 34 remains at 1 for the minimum time set if no polarity change occurs in the meantime on the signal line 23, but if the logic signal of the signal line 23 changes prematurely to a 0, the 1 at the output of the multivibrator 34 will be terminated prematurely. Similarly, the output of the multivibrator 35 associated with the condition that the negative limit is exceeded, as indicated by the limit indicator 33, is held at 0 by the locking line 39 and the negating stage, or inverter, 40, if a 0 is present on the signal line 23.

If the signal falls below the negative limit, as happens at the time t, in FIG. 2, and if this coincides with a 0 on the control line 23, a 1 is accordingly generated at the OR gate 36, which causes the EXCLUSIVE-OR gate 37 to deliver a 1 that triggers the valve 16. The initially triggered valve 16' is locked. For the minimum time $\Delta t$, the phase voltage at the output line 5 is therefore positive and, after the multivibrator 35 is released, the original conduction state of the valves 16 and 16' is restored.

Similarly, if the positive limit is exceeded, which coincides with logic signal 1 on the signal line 23, as happens at the time $t_2$, a 0 is generated by the EXCLUSIVE-OR gate 37 due to the response of the limit indicator 32 and the multivibrator 34, which cause both inputs of the EXCLUSIVE-OR gate to have 1 signals applied to them. As a result of the 0 from the EXCLUSIVE-OR gate, the valve 16 is blocked and the valve 16' is fired. This causes a negative voltage to be present at the inverter output 5. In the case shown here, the logic signal on the command line 23 changes to 0 within the minimum time $\Delta t$, and thereby the multivibrator 35 flips back to its original state, and the EXCLUSIVE-OR gate 37 now receives a 0-signal at both inputs. The signal at the output of the gate 37 therefore remains at 0 and the valves continue to be addressed in accordance with undisturbed operation.

This control makes it possible to decrease the negative voltage-time area (at the time $t_1$) or the positive voltage-time area (time $t_2$) with each intervention command by a one-time intervention and thereby to generate in the output voltage a d-c component by which a magnetization of the transformers can be corrected. In FIG. 2a the change of the smooth phase voltage $U_{TF}$ is shown in comparison with the undisturbed waveform, which is shown dashed.

The same method can also be applied to pulse operation of the inverter as is shown in FIG. 3. The times $t_+$ and $t_-$ are the instants for firing the valves 16 and 16', respectively, which are predetermined by the firing control 21 for undisturbed operation. At the times $t_1$, $t_2$ and $t_3$ limits are exceeded and reversals of the output voltage therefore takes place. Similarly to FIG. 2, the switching command $t_-$ which follows the intervention command $t_1$ takes place only after the end of the intervention time $\Delta t$. However, in the case of the intervention $t_2$, the next switching command $t_-$ falls in the intervention time $\Delta t$ and is therefore suppressed as was already explained in connection with FIG. 2. In the case of intervention $t_3$, the next switching command $t_+$ occurs after the end of the intervention time $\Delta t$, so the time remaining from the end of intervention (time $t_3+t$) to the next switching command would be less than the minimum conduction period of the inverter valves. In the case of commercially available converters, however, a minimum time interlock is provided, by which the instant for the next switching action $t_+$ is correspondingly delayed.

The switching unit 40 for executing the command intervention can, of course, also be designed using other logic components. For example, the limit indicators 32, 33 can be integrated with the monitoring device 28 or with the inverter control 21 and connected to the monitoring device only via the command inputs 29 and 29'.

What is claimed is:

1. In an audio-frequency powerline carrier control system to be connected to an N-phase alternating current powerline, comprising:
   an audio-frequency signal transmitter comprising a controllable inverter with three-phase outputs having an impressed d-c input voltage;
   a plurality of current transformers, in a delta configuration, each coupled to a respective phase output of said inverter to feed the transmitted audio-frequency signal in series into the alternating current powerline;
   filter circuits in parallel with the current transformers;
   an ignition control connected to the inverter and a pulse generator to form ignition control pulses for the inverter to cause the inverter to produce, during a predetermined transmission period, audio-frequency phase voltages at its respective phase outputs, said control including an intervention input for limiting the peak current in order to decrease the voltage time area of the audio-frequency phase voltage in response to an intervention command;
   monitoring means determining the phase currents between the inverter and filter circuit adapted to provide an intervention command if a predetermined current limit for the peak current is reached, the improvement comprising:
   the monitoring means including a monitoring device connected to each phase output for detecting when the associated inverter phase output current exceeds a threshold current of predetermined magnitude to thereby deliver separate intervention commands for each phase when the phase current exceeds the limit, independently of the other phase currents; and
   intervention control means, one for each phase, connected to a corresponding one of the monitoring devices for intervening in the control of the respective inverter phase in response to an intervention command from a respective monitoring device, said intervention control means adapted to apply a d-c voltage component to the respective inverter output phase by decreasing the voltage-time area of the inverter phase output voltage half-cycle whose polarity corresponds to the sign of the peak, as compared to the average voltage-time area of such a half-cycle in the case of non-intervention.

2. The invention according to claim 1 comprising series inductances connecting the respective phase outputs of said inverter to the transformers.

3. The invention according to claim 1 comprising a switching means connected to the filter circuits to short-circuit the filter circuits during intervals between the predetermined transmission periods.

4. The invention according to claim 1 wherein said intervention control means reduce the voltage-time area only once for each intervention command.

5. The invention according to claim 1 wherein said intervention control means include means to control each intervention to cause the reduction of voltage-time area to be constant.

6. The invention according to claim 5 wherein the ignition control is connected to the inverter to provide pulse operation thereof, the system comprising means to effect temporary switch-over of the associated phase of the inverter to reduce the voltage-time area to provide an associated output phase voltage of reversed polarity.

7. The invention according to claim 6 wherein said means to effect temporary switch-over comprises means to maintain the switch-over for a constant period which is fixed in dependence upon the minimum possible period of power supply of the inverter.

8. The invention according to one of claims 1, 2, 3, 4 or 5 wherein the ignition control is connected to the inverter to provide pulse operation thereof, and said intervention control means include means to effect temporary switch-over of the associated phase of the inverter to a phase output of opposite polarity to reduce the voltage-time area.

* * * * *